Sept. 16, 1969     W. P. RINGEWALDT     3,467,116
PICK-UP WALKING STICK
Filed Feb. 12, 1968
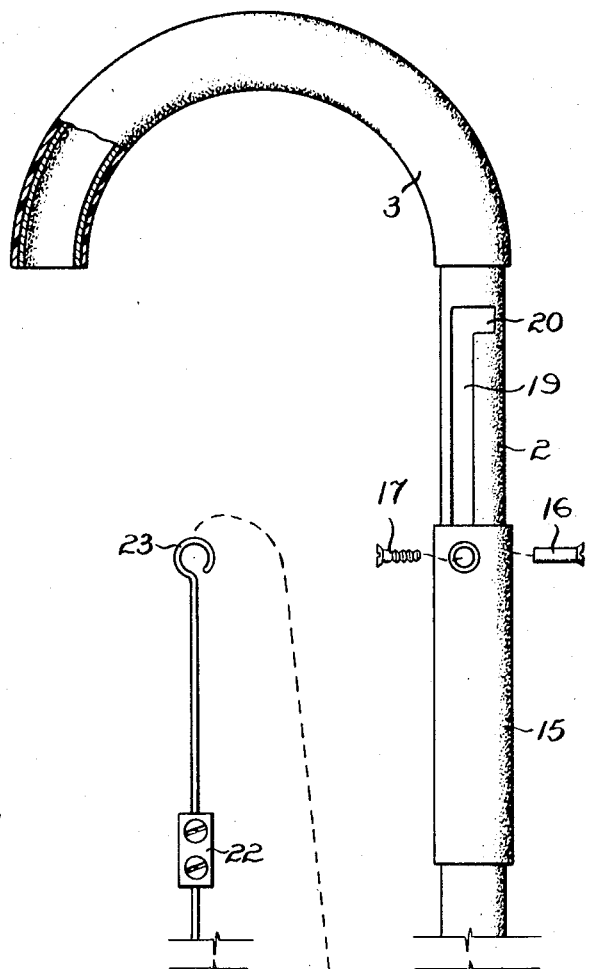
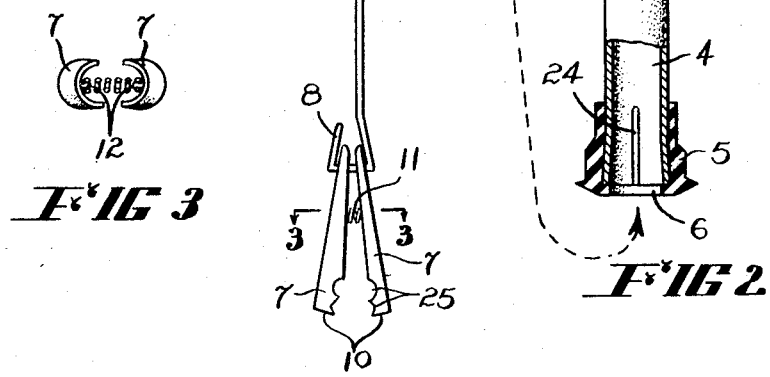
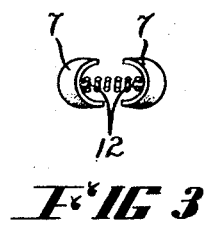

United States Patent Office 3,467,116
Patented Sept. 16, 1969

3,467,116
PICK-UP WALKING STICK
Walter P. Ringewaldt, 26 Beatty Ave., Taperoo,
South Australia 5017, Australia
Filed Feb. 12, 1968, Ser. No. 704,687
Int. Cl. A45b 3/00; E21b 31/00; E21c 19/02
U.S. Cl. 135—47                                    4 Claims

ABSTRACT OF THE DISCLOSURE

A walking stick which is hollow and is provided with the pick-up mechanism consisting of fingers which separate apart when projecting from the lower end of the stick but close together when retracted into the stick so as to be effective when picking up articles from the ground.

---

This invention relates to a pick-up walking stick.

It is already well-known to provide pick-up devices whereby an elderly or infirm person can retrieve objects from the ground without having to stoop down.

It is also well-known to provide walking sticks to aid handicapped persons in walking.

The present invention relates to a single unit which can perform both of these functions and moreover which will do it in a simple and effective manner and by the provision of a pick-up walking stick will thus combine the advantages of both of these objects.

The pick-up walking stick according to this invention comprises a walking stick of tubular form or having at least its stem of tubular shape, the lower end of the walking stick being provided with retractable grips or fingers operated through a control rod from an actuating member near the handle of the walking stick.

The mechanism is so arranged that when the device is to be used as an ordinary walking stick the grips or fingers will be retracted into the hollow of the stick and therefore they will not interfere with its normal use, the grips or fingers being projected from the end of the stick only when it is desired to pick-up an object, this being achieved by moving the actuating member so that, through the control rod, it projects the grips or fingers from the end of the stick, means being provided to move the grips or fingers apart into an open position to allow the object to be grasped, retraction of the grips or fingers into the end of the stick then closing the grips or fingers to hold the object, release being effected by again operating the actuating member to open them by projecting them further from the end of the stick.

Features, such as ready adjustability in length, will be appreciated from the following description which will be made with reference to the accompanying drawings, but it is to be clear that the invention need not be limited thereto.

In the drawings:

FIG. 1 is a side elevation of the stick in pick-up position, and

FIG. 2 is a sectional side elevation showing the stick with the fingers and operating rod separated therefrom for clarity of description and FIG. 3 is an enlarged section through the fingers on line 3—3 of FIG. 2.

The tubular walking stick 1 is formed with the normal straight section 2 and the bent-over section 3 to form the handle 3 at the top, the lower end 4 being provided with a pad 5 of rubber or the like but having an opening 6 therethrough so that a pair of fingers 7 positioned in the lower end 4 of the hollow tube 1 can be moved downwardly to project from the end of the tube as shown in FIG. 1.

The fingers 7 are hinged together by means of a loose connection or the like, in the drawings formed by the hooked end 8 of the operating rod 9, the fingers 7 being trough shaped so that in their retracted position they can be fitted into the lower end of the tubular walking stick 1, the hinging being effected at the inner end of the fingers as shown so that the outer ends 10 ars free when the fingers are projected outwardly from the end of the walking stick to move apart under the action of a spring 11 inserted between these fingers and confined by studs 12 (FIG. 3) on the fingers. When the control rod 9 is moved up or down within the walking stick, the fingers 7 will be similarly moved and will go from a retracted position to an open position but when pushed back will again move to a closed position.

The upper end of the control rod 9 engages a ferrule 15 which encircles the walking stick 1 near the handle end 3 but is slidable on the tubular walking stick, the tube 2 being slotted in the region of the ferrule to allow the control rod 9 to be joined to the ferrule 15 by a pin 16 so that movement of the ferrule simultaneously moves the fingers 7. The pin 16 is engaged by a screwed member 17 so that a flush external finish results.

The slot 19 is provided with a locking section 20 so that the ferrule 15 can be secured in its upper position by turning it to bring the pin 16 into the section 20, thus preventing the sleeve from working downwards on the stick 1.

The operating rod 9 has an intermediate junction member 22 which fits neatly into the hollow of the stick 1 and steadies the rod 9 as well as allowing its length to be adjusted, such for instance if the stick requires shortening, in which case the end of the lower end 4 of the stick can be cut off to shorten the stick. The eye 23 of course engages the pin 16.

The lower end 4 of the tube 2 is split at 24 and has its extreme end belled outwards to ensure that the pad 5 does not slide off the end of the stick.

In this way when the ferrule 15 is moved upwardly, the stick will be in normal condition and adapted to be used as a walking stick, but when it is desired to pick-up an object it is only necessary to push the ferrule 15 downwardly to eject the fingers 7 a sufficient distance so that their free ends open to be ready to grasp the object, and if the stick is then pushed while held at a slight angle so that one of the fingers 7 contacts the ground and is adjacent to the object to be picked-up, an inward motion will cause the fingers to close until they firmly grip the article and the article can then be picked-up while held in the grip of the fingers 7, release being simply effected by pushing the ferrule 15 downwardly a sufficient amount to release the grip.

The fingers 7 have notches 25 on their inner edges to improve their grip on objects.

In the case of an aluminum or similar tubular handle being used, a rubber or other hand grip can be provided at the upper end, and of course instead of curving the tube over to provide the handle it would be possible to attach a separate handle or otherwise modify the walking stick without necessarily departing from the spirit of the invention which is the combining of a walking stick and a pick-up device in such a manner that each can perform its separate function yet the one unit embodies both.

What I claim is:

1. A pick-up walking stick comprising a hollow stick, a handle on said stick, a pick-up mechanism in said stick comprising movable fingers retractable into the lower end of the stick and projectable therefrom, means to spread the fingers apart when projected but to close the same together when retracted, and means on the stick to control movement of the fingers, said fingers being trough shaped to fit into and be guided by the lower end of the hollow stick, said fingers having inner ends loosely coupled and free outer ends, and spring means disposed between the fingers intermediate the ends thereof for urging the outer ends apart, said means to control movement of the fingers comprising a ferrule slidable on the stick adjacent said handle, a pin secured to said ferrule and extending through a slot provided in the stick, and an operating rod engaging said pin and loosely supporting said inner ends of the fingers, such that pressure on the fingers urging them inwards into the stick causes the fingers to close together without the need to actuate any finger control means on the stick and a joining member on said operating rod intermediate the ends thereof and engaging said stick to serve as a guide for the displacement of the rod in the stick.

2. A pick-up walking stick according to claim 1, wherein said fingers have inner edges with notches to improve their grip on objects.

3. A pick-up walking stick according to claim 1 comprising releasable locking means to retain the fingers in retracted position.

4. A pick-up walking stick according to claim 1, wherein said stick has longitudinal slots therein at the lower end thereof in circumferentially spaced relation, a pad on the lower end of said stick covering said slots, said lower end of the stick being widened downwards to hold the pad thereon.

References Cited

UNITED STATES PATENTS

| | | | |
|---|---|---|---|
| 465,222 | 12/1891 | Ulbricht | 294—19 |
| 619,235 | 2/1899 | Schwarting | 135—58 |
| 720,078 | 2/1903 | Smith et al. | 294—86.28 |
| 1,421,152 | 6/1922 | Berman | 294—100 X |
| 3,093,402 | 6/1963 | Sisson | 135—47 X |
| 3,265,429 | 8/1966 | Shatt | 294—19 |

PETER M. CAUN, Primary Examiner

U.S. Cl. X.R.

294—86.28, 100